(12) United States Patent
Evans (10) Patent No.: US 8,077,712 B2
(45) Date of Patent: Dec. 13, 2011

(54) STATIC NEIGHBOR WAKE ON LOCAL AREA NETWORK

(75) Inventor: Alun Christopher Evans, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 12/137,720

(22) Filed: Jun. 12, 2008

(65) Prior Publication Data

US 2009/0310607 A1    Dec. 17, 2009

(51) Int. Cl.
*H04L 12/28* (2006.01)
(52) U.S. Cl. ....................................... 370/389
(58) Field of Classification Search ............ 370/389
See application file for complete search history.

(56) References Cited

U.S. PATENT DOCUMENTS

| | | | | |
|---|---|---|---|---|
| 6,459,705 B1* | 10/2002 | Cheng | ........................... | 370/463 |
| 6,526,507 B1* | 2/2003 | Cromer et al. | ................ | 713/162 |
| 6,591,368 B1* | 7/2003 | Ryu | ............................... | 713/323 |
| 7,324,518 B2* | 1/2008 | Dai et al. | ....................... | 370/392 |
| 2001/0043598 A1* | 11/2001 | Brabenac | ....................... | 370/389 |
| 2005/0021711 A1* | 1/2005 | Stieger et al. | ................. | 709/223 |
| 2005/0021770 A1* | 1/2005 | Helm et al. | .................... | 709/228 |
| 2005/0229160 A1* | 10/2005 | Rothman et al. | .............. | 717/124 |
| 2006/0245350 A1* | 11/2006 | Shei et al. | ..................... | 370/216 |
| 2007/0147334 A1* | 6/2007 | Guthrie | ......................... | 370/349 |
| 2008/0301322 A1* | 12/2008 | Horibe | .......................... | 709/245 |

\* cited by examiner

*Primary Examiner* — Ayaz Sheikh
*Assistant Examiner* — Hai-Chang Hsiung
(74) *Attorney, Agent, or Firm* — P. Su (57) ABSTRACT

In one embodiment, a method includes obtaining traffic that is to be forwarded to a neighboring device, and determining if the neighboring device is in a state that enables the neighboring device to receive the traffic. The method also includes automatically sending a first packet to the neighboring device if the neighboring device is not in the state that enables the neighboring device to receive the traffic. The first packet includes a bit sequence arranged to cause the neighboring device to awaken itself if the neighboring device is asleep.

12 Claims, 5 Drawing Sheets

STATIC NEIGHBOR WAKE ON LOCAL AREA NETWORK

BACKGROUND OF THE INVENTION

Networked devices, e.g., server devices within local area networks (LANs), are typically powered on permanently, so that they may be accessed at substantially any time over the network, by any client device. Most home devices act as a client in this client-server paradigm, and the home devices support "green" power saving features that would power down the device when the device was not being used. In other words, devices often are placed into a deep, power-saving sleep in order to conserve power when the devices are unlikely to be used and/or are accessed relatively infrequently. By way of example, a server that is unlikely to be frequently accessed may remain in a power-saving sleep such that power may be conserved until there is an attempt to access it. Such a server may be arranged to be awakened when a packet that contains a particular sequence of bits, or a magic packet, is received.

With the advent of networked homes, home clients are becoming home servers and, thus, may have the requirement of being accessed at any time. As a result, users are disabling the power saving features associated with such home servers to enable the home servers to be substantially instantly accessed. However, home server usage patterns are likely to be relatively sporadic. As such, a home server may draw and consume power, although it is not being accessed for relatively long periods of time.

To reduce power consumption associated with a home server, the home server may be configured to enter a deep, power saving sleep, and arranged to be awakened when a magic packet is received. Typically, in a home LAN with a home server, a router connects the home LAN to an overall network. When the router receives traffic that is intended for the home server, a user or network administrator may send a magic packet to the home server in an attempt to wake the device from the power saving sleep. If the home server is configured to be woken by the magic packet, the home server may be awakened upon receipt of the magic packet.

DESCRIPTION OF THE EXAMPLE EMBODIMENTS

General Overview

In one embodiment, a method includes obtaining traffic that is to be forwarded to a neighboring device, and determining if the neighboring device is in a state that enables the neighboring device to receive the traffic. The method also includes automatically sending a first packet to the neighboring device if the neighboring device is not in the state that enables the neighboring device to receive the traffic. The first packet includes a bit sequence arranged to cause the neighboring device to awaken itself if the neighboring device is asleep.

Description

Allowing routers, or devices with routing functionality, to automatically awaken a computing device, e.g., a server, which includes wake-on-local-area-network (WOL) functionality when it is determined that the computing device is not reachable enables a sleeping computing device to be woken efficiently. As will be appreciated by those skilled in the art, a sleeping computing device is a computing device that is effectively not receiving power except on an associated interface, as for example a network adapter, which may receive some information or data. Enabling a router or similar device to automatically send a WOL packet to awaken a sleeping computing device upon determining that the computing device is not in a state that is conducive to receiving traffic substantially eliminates the need for a network administrator or a user of another system that is in communication with the router to awaken the sleeping computing device by manually causing a WOL packet to be sent to the sleeping computing device. A network administrator may access a router to awaken a device, and may provide permissions to other end users to awaken the device such that the network administrator effectively does not need to be involved in awakening the device, and such that knowledge of the WOL is essentially not required by the end users.

In one embodiment, when a router receives traffic that is intended for or is specified as passing through an unreachable neighboring device that fails to respond to a probe packet, the router may substantially automatically send a WOL packet, or a "magic" packet that contains a particular bit sequence which identifies the magic packet as being suitable for causing the neighboring device to awaken, to the neighboring device. Upon receiving the WOL packet, if the neighboring device is in a power-saving sleep and is WOL enabled, i.e., is arranged to identify WOL packets and to awaken itself upon receiving a WOL packet, the neighboring device may then awaken and notify the router that the neighboring device is ready to receive traffic. Upon receiving a notification from the neighboring device, the router may send the traffic to the neighboring device.

Figure 1:
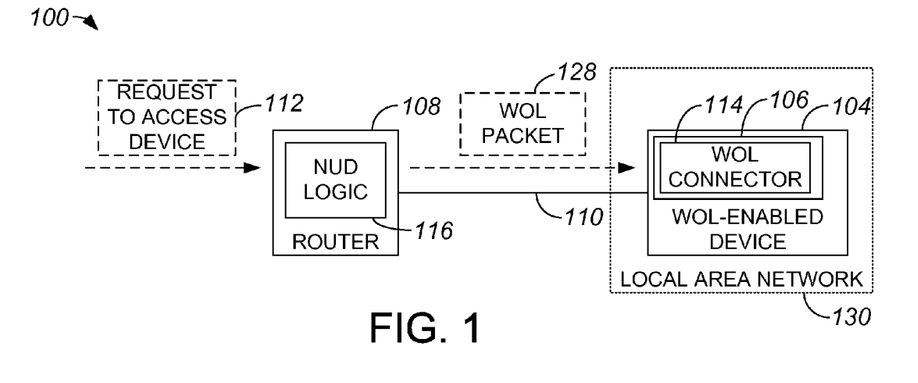
FIG. 1 is a block diagram representation of a system in which a router automatically sends a wake-on-local-area-network (WOL) packet to wake an unresponsive WOL-enabled device in accordance with an embodiment of the present invention.

Referring initially to FIG. 1, a network that includes a routing device which is configured to automatically send a WOL packet to a device in a LAN will be described in accordance with an embodiment of the present invention. A network 100 includes a routing device 108, which is generally any device which is arranged to buffer and to forward data packets within a network, and a LAN 130. In general, network 100 may be a wide area network (WAN).

LAN 130 includes a WOL enabled device 104. A WOL enabled device is generally a device that, when shut down, has a powered up network adapter or card 106. Card 106 includes, in one embodiment, a WOL connector 114. WOL connector 114 may be arranged to be directly connected to a network interface card (NIC) (not shown) such that the NIC may receive power substantially directly from a power supply unit (not shown) even though WOL enabled device 104 may be off.

Routing device or router 108, which is in communication with device 104 across a communications channel 110, is arranged to receive a request 112, as for example from a source, to forward traffic to or otherwise access device 104. If router 108 is unable to reach device 104, logic 116 on router is arranged to generate and to forward a WOL packet 128 to device 104. In one embodiment, logic 116, which may include hardware and/or executable software logic embodied on a tangible media, includes neighbor unreachability discovery (NUD) logic. It should be appreciated that software logic typically includes executable code devices. NUD logic is a feature of Internet Protocol version 6 (IPv6) that enables router 108 to determine whether a neighboring device such as device 104 is reachable. When logic 116 determines it is appropriate to send WOL packet 128 and then sends WOL packet 128 to device 104, if device 104 is in a power-saving sleep, card 106 still determines that WOL packet 128 has been received on communications channel 110, and device 104 will effectively awaken itself.

Figure 2:
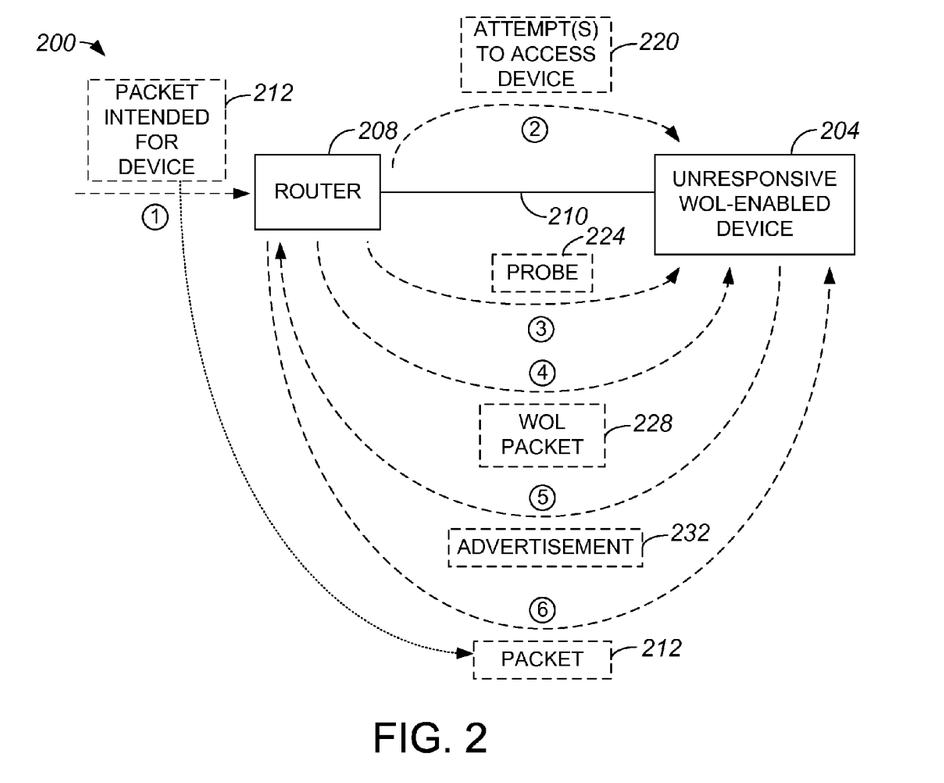
FIG. 2 is a block diagram representation of communications between a router and a sleeping WOL enabled device in accordance with an embodiment of the present invention.

Communications between a router and an unresponsive WOL enabled device will be discussed with reference to FIG. 2. FIG. 2 is a block diagram representation of communications between a router and a sleeping WOL enabled device in accordance with an embodiment of the present invention. Within a network 200 in which a router 208 communicates with an unresponsive WOL enabled neighboring device 204 across a communications channel 210, router 208 may receive a packet 212 from a source (not shown) that is intended for device 204.

Upon receiving packet 212, router 212 makes one or more attempts 220 to access device 204. Because device 204 is in an unresponsive state, attempts 220 generally fail. Generally, device 204 may be unresponsive for a number of different reasons including, but not limited to, being off-line because device 204 is non-functional, being off-line for maintenance purposes, and being asleep. In the described embodiment, device 204 is unresponsive because it is asleep, although router 208 is initially unaware of the reason behind the unresponsiveness of device 204.

When attempts 220 fail, router 208 may send a probe 224 to device in order to determine if device 204 is reachable. If sending probe 224 fails to procure a response from device 204, router 208 sends a WOL packet 228 to device 204. As device 204 is WOL enabled and is asleep, device 204 will awaken in response to receiving WOL packet 228. Once awake, device 204 sends an advertisement 232 to router 208 that indicates that device 204 is available for receiving traffic. In response, router 208 forwards packet 212 to device 204.

Figure 3A:
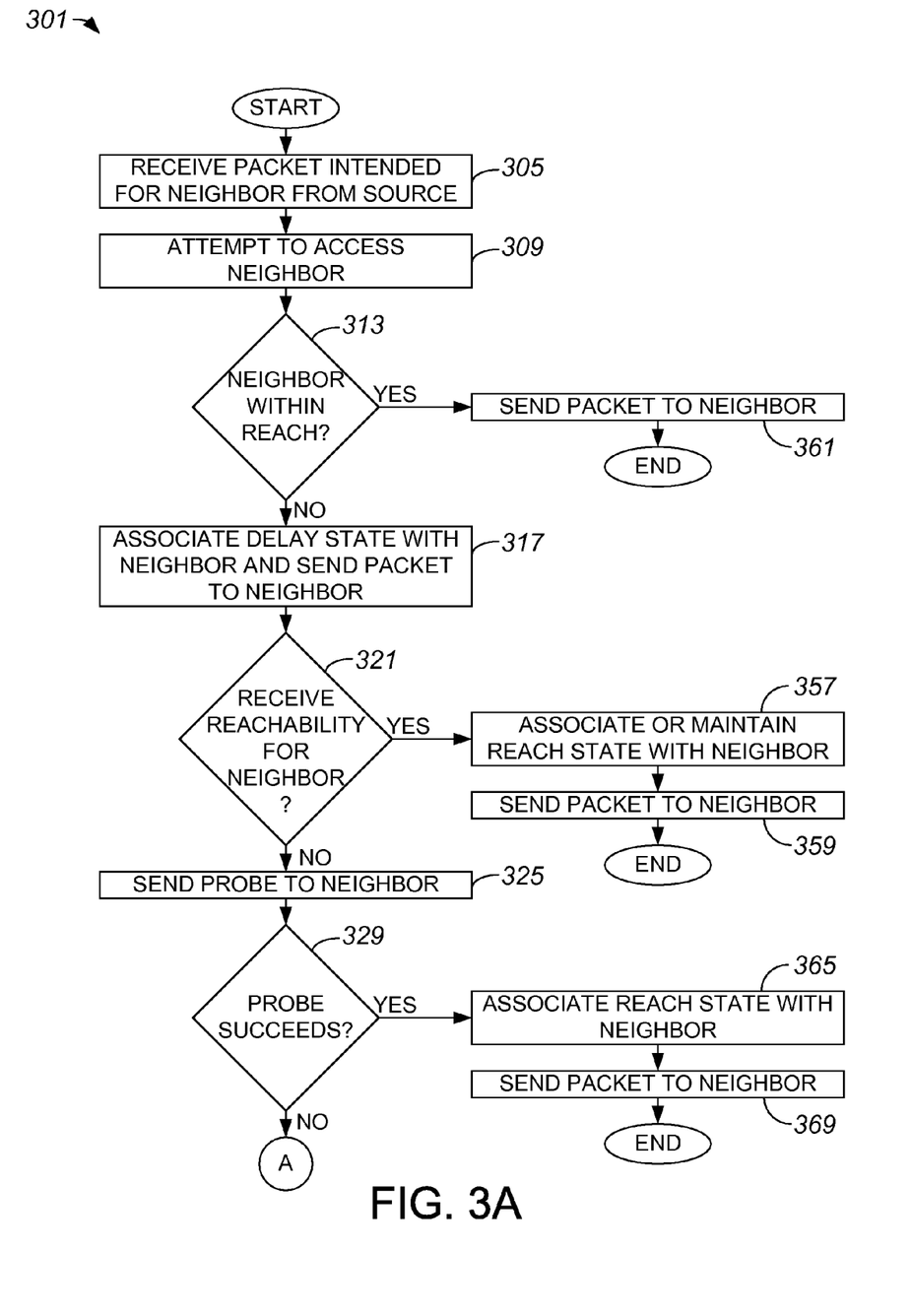
FIGS. 3A and 3B are a process flow diagram which illustrates a method of communicating with an unresponsive device in accordance with an embodiment of the present invention.
Figure 3B:
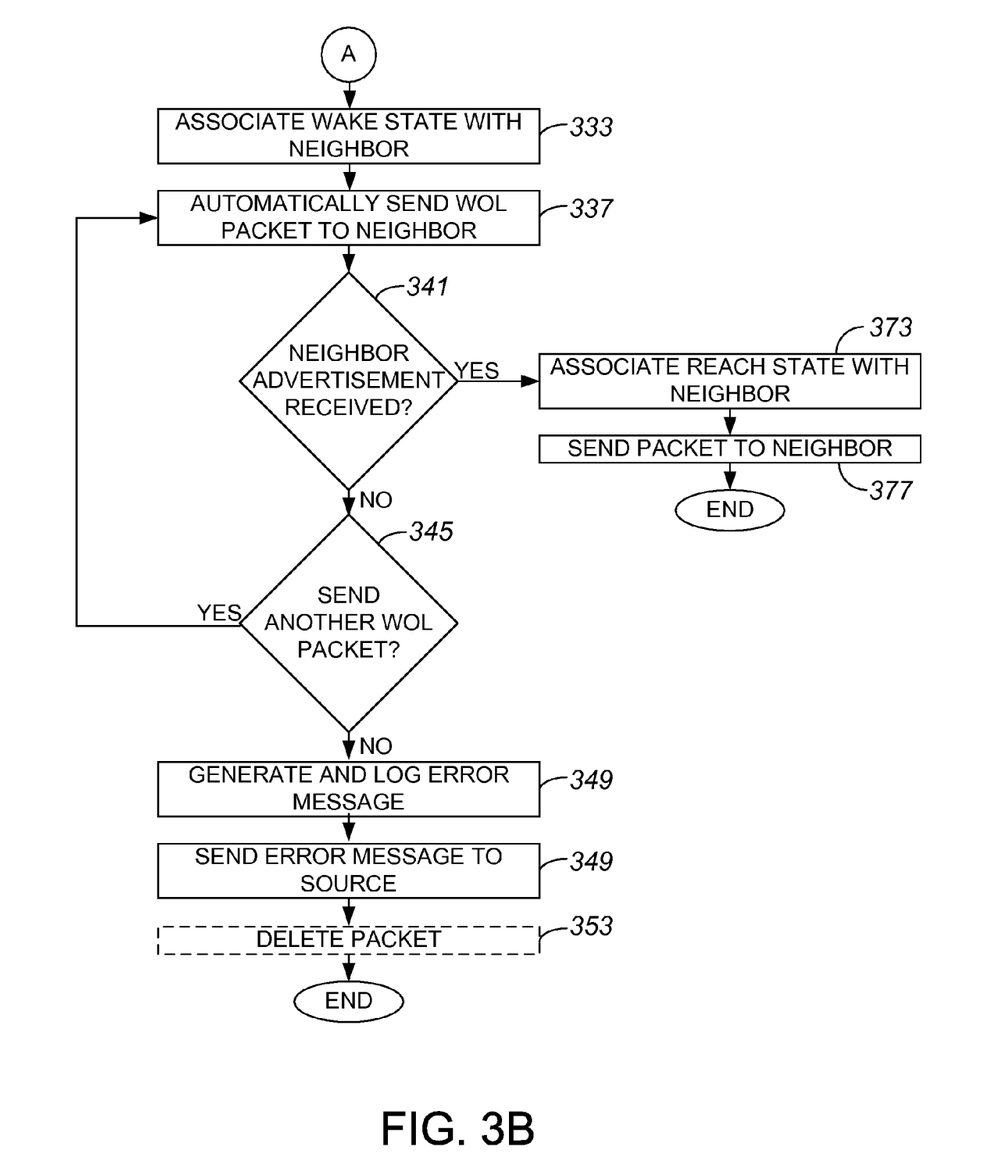

With reference to FIGS. 3A and 3B, a method of communicating with a neighboring device from the point-of-view of a router or similar device that is configured to automatically send WOL packets to unresponsive devices will be described in accordance with an embodiment of the present invention. A process 301 of communicating with a neighboring device begins at step 305 in which a router or device with routing functionality receives or otherwise obtains a packet intended for a neighboring device. The packet or, more generally, traffic is received from a source which is attempting to provide information to the neighboring device. The neighboring device may be substantially any device that is configured or otherwise arranged to receive packets. In one embodiment, the neighboring device may be a computing device such as a server.

After the packet is received, the router or device with routing functionality makes an attempt to access the neighboring device in step 309. The attempt may include, but is not limited to including, attempting to resolve the neighboring device or assessing whether the neighboring device is in a reachable state. A determination is made in step 313 as to whether the neighboring device is within reach, e.g., is reachable or otherwise accessible. If it is determined that the neighboring device is within reach, the indication is that the packet from the source may be provided to the neighboring device. As such, process flow moves from step 313 to step 361 in which the packet is sent or otherwise provided to the neighboring device. The process of communicating with a neighboring device is completed once the packet is sent to the neighboring device.

Alternatively, if it is determined in step 313 that the neighboring device is not accessible, a "delay" state is associated with the neighboring device in step 317 and the packet is sent to the neighboring device. The delay state, which may be associated with NUD functionality within an IPv6 compliant system is arranged to provide upper-layer protocols with additional time to provide reachability confirmation relative to the neighboring device. When the packet is received for the neighboring device, the neighboring device is typically associated with a stale ND state. The packet is forwarded to the neighboring device, the state is changed to a delay state, and a timer is started. Marking the neighboring device as delayed allows the neighboring device to respond without further packets from the router. In one embodiment, if the timer expires after a predetermined amount of time, the ND state may be changed to a probe state.

A determination is made in step 321 as to whether an indication of reachability is received for the neighboring device. If an indication of reachability is received, process flow moves to step 357 in which the reach state of the neighboring device is either maintained, e.g., if the neighboring device was already in a reach state, or is effectively established, e.g., if the neighboring device is not already in a reach state. Then, in step 359, the packet is sent or otherwise provided to the neighboring device, and the process of communicating with a neighboring device is completed.

Alternatively, if an indication of reachability is not received, then in step 325, a probe is sent to the neighboring device. A probe is generally a solicitation message that is intended to solicit a confirmation of reachability from the neighboring device. After the probe is sent, if a neighbor advertisement is received, it is determined in step 329 whether the probe was successful. That is, a determination is made as to whether a confirmation of reachability has been received within a reasonable, e.g., predetermined, time period after the probe is sent. If it is determined that the probe was successful, the implication is that a confirmation of reachability has been received. Hence, in step 365, a reach state is associated with the neighboring device. The packet is then sent to the neighboring device in step 369, and the process of communicating with a neighboring device is completed.

Returning to step 329, if it is determined that the probe was not successful, a wake state is associated with the neighboring device in step 333. A wake state is arranged to indicate that an automatic attempt is to be made, or is in the process of being made, to waken the neighboring device. After the wake state is associated with the neighboring device, a WOL packet is automatically sent to the neighboring device, i.e., by the router or device with routing functionality, in step 337. As previously mentioned, a WOL packet may be associated with substantially any message that includes a magic packet or packet that includes a magic sequence. The WOL packet is automatically sent in that the router or device with routing functionality sends the WOL packet upon determining that the probe was unsuccessful. It should be understood that the router or device with routing functionality may identify an address, as for example a media access control (MAC) address or an Ethernet address, for the neighboring device discovered by IPv6 Neighbor Discovery, or pre-configured by a network administrator.

Once the WOL packet is sent to the neighboring device, it is determined if a neighbor advertisement is received from the neighboring device in step 341. In general, the neighbor advertisement is expected to be received within a predetermined time period after the WOL packet is sent. If a neighbor advertisement, or an indication that the neighboring device is reachable, is not received within the predetermined time period, then it is determined in step 345 if another WOL packet is to be automatically sent to the neighboring device. In one embodiment, the number of WOL packets that are sent to the neighboring device may be predetermined.

If the determination in step 345 is that another WOL packet is to be sent, process flow returns to step 337 in which a WOL packet is automatically sent to the neighboring device. Alternatively, if it is determined in step 345 that another WOL packet is not to be sent, then an error message is generated and logged in step 349, e.g., by the router or device with routing functionality. In step 349, the error message is sent to the source of the packet to indicate that the packet has not been provided to the neighboring device. After the error message is sent to the source, the packet optionally is deleted in step 353, and the process of communicating with the neighboring device is terminated.

Returning back to step 341, if it is determined that a neighbor advertisement has been received, then the indication is that the neighboring device has been awaken. Accordingly, process flow moves to step 373 in which a reach state is associated with the neighboring device. Then, in step 377, the packet received from the source is sent to the neighboring device, and the process of communicating with a neighboring device is completed. It should be appreciated that a reachable state may become a stale state after a predetermined amount of time, e.g., approximately third seconds, in which a positive confirmation which indicates that the connections is making forward progress has not been received. In one embodiment, WOL marked entries may be maintained as having a stale state for any amount of time, although stale entries may be deleted when a particular amount of time has elapsed.

Figure 4:
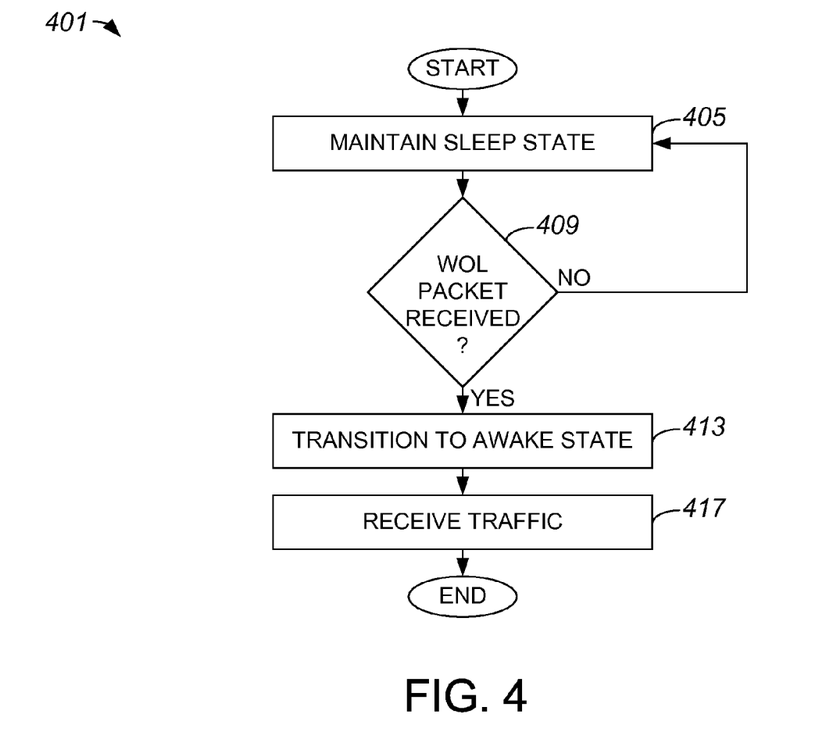
FIG. 4 is a process flow diagram which illustrates a process of responding to a WOL packet associated with a wake-up frame in accordance with an embodiment of the present invention.

When a WOL-enabled device that is in a power-saving sleep receives a WOL packet that is automatically generated by a router or device with routing functionality, the WOL-enabled device generally awakens such that traffic may be received. FIG. 4 is a process flow diagram which illustrates a process of operating a WOL-enabled device in accordance with an embodiment of the present invention. A process 401 of operating a WOL-enabled device begins at step 405 in which the WOL-enabled device maintains a sleep state, e.g., remains in a power-saving sleep. Typically, when a WOL-enabled device is in a sleep state, a network interface controller (NIC) or network adapter of the WOL-enabled device continues to receive power, and may essentially listen on a network connection for a WOL, or magic, packet to arrive on the network connection.

A determination is made in step 409 as to whether a WOL packet is received. In one embodiment, the determination includes a determination of whether the NIC has identified a WOL packet. If it is determined that a WOL packet has not been received, process flow returns to step 405 in which a sleep state is maintained. Alternatively, if it is determined that WOL packet has been received, a transition is made to an awake state in step 413, or a state in which the WOL-enabled device is capable of receiving data traffic. It should be understood that although a WOL-enabled device may also transition to an awake state if a network administrator or user of the WOL-enabled device awakens the WOL-enabled device, steps associated with such an awakening method are not shown or described for ease of discussion and clarity of illustration.

After the transition from a sleep state to an awake state is made, the WOL-enabled device may receive traffic in step 417. That is, the WOL-enabled device is, upon transitioning to an awake state, arranged to receive the traffic that precipitated the transition from the sleep state to the awake state. Once the traffic is received, the process of operating a WOL-enabled device is completed. In general, the WOL-enabled device may be associated with an operating system that is configured to effectively put the WOL-enabled device to sleep after some period of inactivity.

A WOL, or magic, packet generally includes a sequence of bits that, when read by a WOL-enabled recipient of the packet, is recognizable as being an instruction for the recipient to awaken itself, e.g., to place itself in a state that enables traffic to be received. In the described embodiment, a WOL packet is a packet that is specifically formatted to be sent over a network, and includes identifying features that effectively allow only the device that the WOL packet is intended to awaken to identify that the WOL packet is intended for it. As will be appreciated by those skilled in the art, other devices, e.g., network cards, that receive a WOL packet intended for a given device will effectively ignore the WOL packet.

Figure 5:
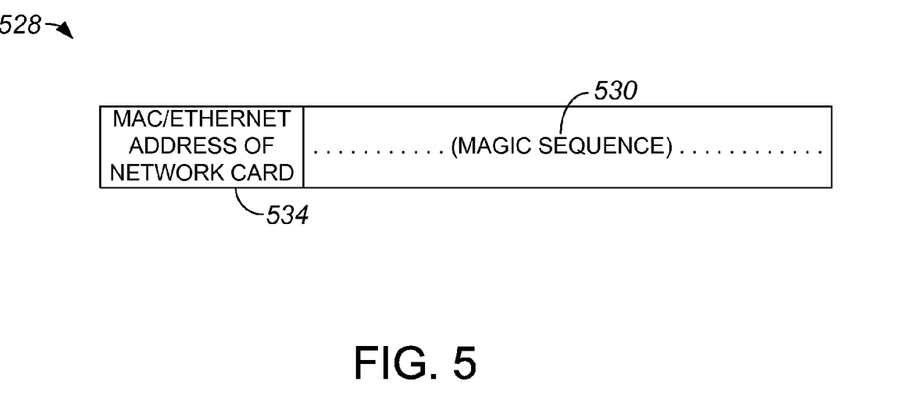
FIG. 5 is a diagrammatic representation of a WOL packet or magic packet.

FIG. 5 is a diagrammatic representation of a WOL packet or magic packet. A WOL packet 528 includes an address 534 of a network card associated with a device, i.e., the target device for which WOL packet 528 is intended. Address 534 may be an Ethernet address or a MAC address. In one embodiment, address 534 may be expressed as approximately sixteen repetitions of the MAC address of the target device. WOL packet 528 also includes a sequence 530 of bits that indicate to the target device that the target device should awaken itself, or otherwise ready itself for receiving data traffic. In general, a target device may have a substantially unique associated WOL packet 528 which is known to each router that is in communication with the target device.

Figure 6:
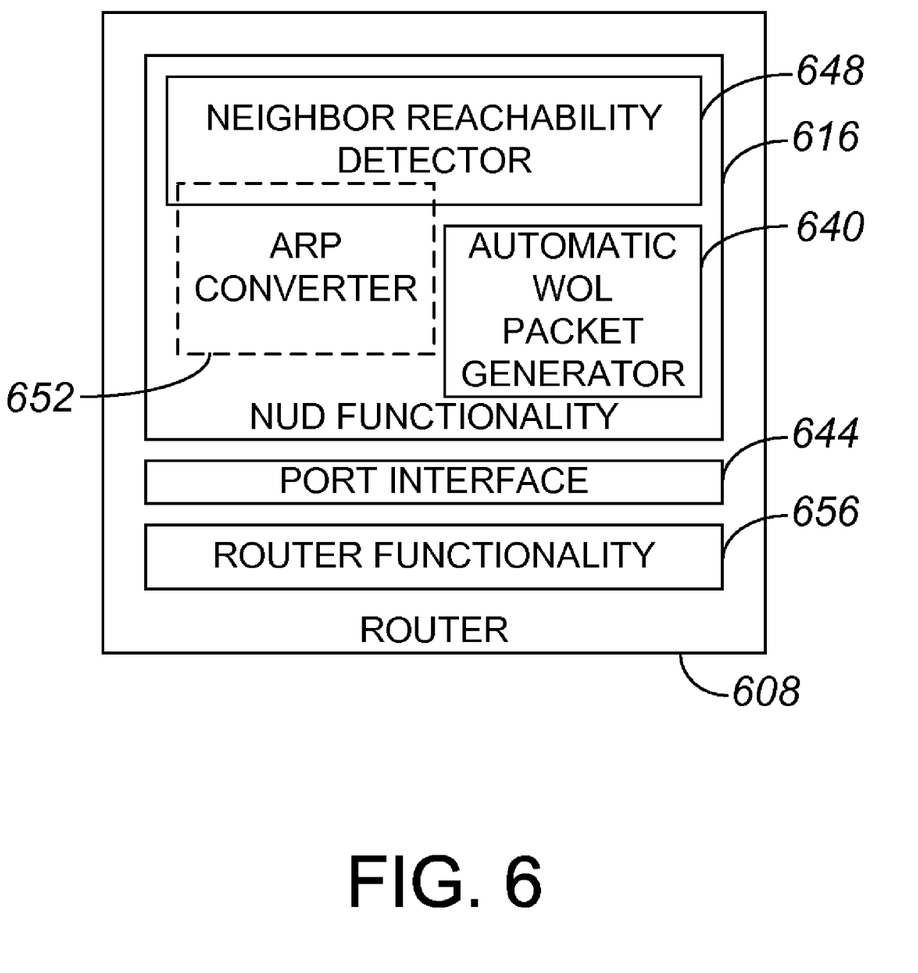
FIG. 6 is a block diagram representation of a router that automatically sends a WOL packet in an attempt to wake an unresponsive neighboring device in accordance with an embodiment of the present invention.

FIG. 6 is a block diagram representation of a router that automatically sends a WOL packet in an attempt to wake an unresponsive neighboring device in accordance with an embodiment of the present invention. A router 608 includes a port interface 644 through which traffic transmitted from a source may be received, and through which the traffic may be forwarded to a target device such as a neighboring device. Port interface 644 also allows messages from the target device, as for example advertisements of reachability or availability, to be received. In general, port interface 644 allows router 608 to communicate with other devices within a network.

Router 608 also includes router functionality 656, or functionality 656 that allows router 608 to identify and to select paths, as for example using routing tables, over which traffic may be routed. Router 608 also includes NUD functionality 616, as well as ND and NUD functionality (not shown). As previously discussed, NUD functionality 616 provides router 608 with information relating to whether a neighboring device is reachable. NUD functionality 616 includes a neighbor reachability detector 648 that determines whether a neighboring device is reachable or otherwise able to receive traffic transmitted by router 608. In one embodiment, NUD functionality 616 determines that the neighboring device is reachable if a neighbor advertisement is received from the target. NUD functionality 616 also includes an automatic WOL packet generator 640 that automatically generates and sends a WOL packet to a neighboring device that is unreachable in an attempt to wake the neighboring device. Automatic WOL packet generator 640 creates a packet that includes the Ethernet or MAC address of an intended destination of the packet, as well as a sequence of bits that identifies the packet as a WOL packet. Automatic WOL packet generator 640 also ascertains when it is appropriate to send a WOL packet, as for example when automatic WOL packet generator 640 determines that a threshold amount of time has passed since a probe was sent to the neighboring device, or that a predetermined number of probes has been sent to the neighboring device to no avail.

NUD functionality 616 is generally associated with an internet protocol such as IPv6. To use automatically dispatched WOL packets in a system that supports IP version 4 (IPv4), an address resolution protocol (ARP) that has a default lifetime, e.g., a default lifetime of approximately two hours, may be altered from resolving an address for the neighboring device to determining the reachability of a neighboring device. The ARP may be altered, in one embodiment, such that if an ARP request message sent to a target device receives no response, the target device is determined to be unreachable. Upon determining that the target device is unreachable, a WOL packet may be automatically sent by automatic WOL packet generator 640 to the target device. The functionality that enables the ARP to be altered, or augmented, if router 608 is used with respect to an IPv4 internet protocol may be included in an optional ARP converter 652 which cooperates with neighbor reachability detector 648.

Although only a few embodiments of the present invention have been described, it should be understood that the present invention may be embodied in many other specific forms without departing from the spirit or the scope of the present invention. By way of example, while the present invention has been described as being suitable for use in systems that use or otherwise support IPv4 or IPv6, the use of automatically dispatched WOL packets may generally be applied with respect to any suitable internet protocol. The use of automatically dispatched WOL packets may be used in substantially any environment associated with neighbor discover or neighbor unreachability detection.

The steps associated with the methods of the present invention may vary widely. Steps may be added, removed, altered, combined, and reordered without departing from the spirit or the scope of the present invention. Therefore, the present examples are to be considered as illustrative and not restrictive, and the invention is not to be limited to the details given herein, but may be modified within the scope of the appended claims.

The invention claimed is:

1. A method comprising:
obtaining traffic that is to be forwarded to a neighboring device, wherein the neighboring device is associated with a local area network (LAN) and enabled to support wake-on-LAN (WOL) functionality, wherein the LAN is compliant with an internet protocol (IP) standard;
determining if the neighboring device is in a state that enables the neighboring device to receive the traffic, wherein determining if the neighboring device is in the state that enables the neighboring device to receive the traffic includes sending a probe to the neighboring device and performing a neighbor unreachability detection (NUD) process, the probe being a probe packet, wherein the NUD process includes sending the probe packet to the neighboring device and determining if a response to the probe packet is obtained from the neighboring device, and wherein if the response is not obtained, the neighboring device is not in the state that enables the neighboring device to receive the traffic;
automatically sending a first packet to the neighboring device if it is determined that the neighboring device is not in the state that enables the neighboring device to receive the traffic and when a determination is made not to send an additional probe, wherein the first packet is arranged to cause the neighboring device to awaken if the neighboring device is asleep;
determining if a response to the first packet is received from the neighboring device within a predetermined time period; and
forwarding the traffic to the neighboring device if the response to the first packet is received from the neighboring device within the predetermined time period.

2. The method of claim 1 wherein the first packet is a WOL packet, the WOL packet containing a first sequence of bits that identifies the neighboring device and a second sequence of bits that indicates that the neighboring device is to awaken.

3. The method of claim 1 wherein the response to the first packet is received from the neighboring device after the neighboring device awakens.

4. The method of claim 1 wherein the determination is made not to send the additional probe when a threshold amount of time has passed since the probe was sent.

5. An apparatus comprising:
means for obtaining traffic that is to be forwarded to a neighboring device, wherein the neighboring device is associated with a local area network (LAN) and enabled to support wake-on-LAN (WOL) functionality, wherein the LAN is compliant with an internet protocol (IP) standard;
means for determining if the neighboring device is in a state that enables the neighboring device to receive the traffic wherein the means for determining if the neighboring device is in the state that enables the neighboring device to receive the traffic include meals for sending a probe to the neighboring device and means for performing a neighbor unreachability detection (NUD) process, the probe being a probe packet, wherein the NUD process includes sending the probe packet to the neighboring device and determining if a response to the probe packet is obtained from the neighboring device, and wherein if the response is not obtained, the neighboring device is not in the state that enables the neighboring device to receive the traffic;
means for automatically sending a first packet to the neighboring device if it is determined that the neighboring device is not in the state that enables the neighboring device to receive the traffic and when a determination is made not to send an additional probe, wherein the first packet is arranged to cause the neighboring device to awaken if the neighboring device is asleep;
means for determining if a response to the first packet is received from the neighboring device within a predetermined time period; and means for forwarding the traffic to the neighboring device if the response to the first packet is received from the neighboring device within the predetermined time period.

6. The apparatus of claim 5 wherein the response to the first packet is received from the neighboring device after the neighboring device awakens.

7. Logic embodied in one or more tangible media that, when executed, is operable to:
    obtain traffic that is to be forwarded to a neighboring device, wherein the neighboring device is associated with a local area network (LAN) and enabled to support wake-on-LAN (WOL) functionality, wherein the LAN is compliant with an internet protocol (IP) standard;
    determine if the neighboring device is in a state that enables the neighboring device to receive the traffic, wherein the logic operable to determine if the neighboring device is in the state that enables the neighboring device to receive the traffic includes logic operable to send a probe to the neighboring device and logic operable to perform a neighbor unreachability detection (NUD) process, the probe being a probe packet, wherein the logic operable to perform the NUD process is operable to send the probe packet to the neighboring device and to determine if a response to the probe packet is obtained from the neighboring device, and wherein if the response is not obtained, the neighboring device is not in the state that enables the neighboring device to receive the traffic;
    automatically send a first packet to the neighboring device if it is determined that the neighboring device is not in the state that enables the neighboring device to receive the traffic and when a determination is made not to send an additional probe, wherein the first packet is arranged to cause the neighboring device to awaken if the neighboring device is asleep ;
    determining if a response to the first packet is received from the neighboring device within a predetermined time period; and
    forwarding the traffic to the neighboring device if the response to the first packet is received from the neighboring device within the predetermined time period.

8. The logic of claim 7 wherein the first packet is a WOL packet, the WOL packet containing a first sequence of bits that identifies the neighboring device and a second sequence of bits that indicates that the neighboring device is to awaken.

9. The logic of claim 7 wherein the response to the first packet is received from the neighboring device after the neighboring device awakens.

10. An apparatus comprising:
    a port interface, the port interface being communicably coupled to a source of traffic and to a target of the traffic, the target of the traffic being a neighbor of the apparatus and associated with a local area network (LAN);
    a neighbor reachability detector, the neighbor reachability detector being arranged to determine whether the target is reachable, wherein the neighbor reachability detector is arranged to send at least one probe to the target to determine the reachability of the target;
    an automatic wake on LAN (WOL) packet generator, the automatic WOL packet generator being arranged to automatically generate a WOL packet intended for the target when it is determined by the neighbor reachability detector that the target is not reachable, wherein the automatic WOL packet generator is further arranged to automatically provide the WOL packet to the target when the at least one probe fails to determine that the target is reachable; and
    a converter, the converter being associated with the neighbor reachability detector and being arranged to alter an address resolution protocol such that the address resolution protocol may determine the reachability of the target.

11. The apparatus of claim 10 wherein the apparatus is a router associated with an internet protocol version 4 (IPv4) standard.

12. The apparatus of claim 10 wherein the apparatus is a router associated with an internet protocol version 6 (IPv6) standard.

* * * * *